(12) United States Patent
Asada

(10) Patent No.: US 7,309,131 B2
(45) Date of Patent: Dec. 18, 2007

(54) PROJECTOR

(75) Inventor: Mitsuyasu Asada, Daito (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 161 days.

(21) Appl. No.: 11/184,377

(22) Filed: Jul. 18, 2005

(65) Prior Publication Data
US 2006/0290894 A1    Dec. 28, 2006

(30) Foreign Application Priority Data
Jul. 23, 2004    (JP)    ............... 2004-004354 U

(51) Int. Cl.
*G03B 21/16*    (2006.01)

(52) U.S. Cl. ............... 353/61; 353/58; 353/119; 348/748

(58) Field of Classification Search ............. 353/52, 353/57–61, 119; 348/748, 749, 794
See application file for complete search history.

(56) References Cited

U.S. PATENT DOCUMENTS

| | | | | |
|---|---|---|---|---|
| 6,109,767 A * | 8/2000 | Rodriguez | ............... | 362/294 |
| 6,641,267 B2 * | 11/2003 | Ohishi et al. | ............... | 353/61 |
| 6,808,273 B2 * | 10/2004 | Morinaga | ............... | 353/119 |
| 6,939,010 B2 * | 9/2005 | Tanaka | ............... | 353/52 |
| 7,140,734 B2 * | 11/2006 | Lim | ............... | 353/61 |
| 2002/0131023 A1 * | 9/2002 | Shiraishi et al. | ............... | 353/57 |
| 2004/0239883 A1 * | 12/2004 | Yoshikawa | ............... | 353/22 |

FOREIGN PATENT DOCUMENTS

| | | |
|---|---|---|
| JP | 10-186546 | 7/1998 |
| JP | 2000-206619 | 7/2000 |
| JP | 2002-258248 | 9/2002 |
| JP | 2002-341448 | 11/2002 |
| JP | 2003-215712 | 7/2003 |
| JP | 2004-054055 | 2/2004 |

* cited by examiner

*Primary Examiner*—Andrew T Sever
(74) *Attorney, Agent, or Firm*—Peter Ganjian

(57) ABSTRACT

When a front cover 12 in which an inner grille 13 is fitted is mounted to the body of the projector, a fin member 13*b* formed as one unit with the inner grille 13 is placed with very little clearance between itself and a partition 33 separating the region where a light source device 20 is provided from the region where an optical system 100 is provided. Therefore, hot air of a first fan can be prevented from passing between the partition 33 and the front cover 12 and entering the region where the optical system 100 is provided. As a result, it becomes possible to prevent the hot air from entering the above region and further entering the optical system 100 or entering the optical path of a projection lens 26 to cause a heat-wave effect, thus the projector is capable of suppressing a heat-wave effect.

8 Claims, 6 Drawing Sheets

PROJECTOR

BACKGROUND OF THE INVENTION

1. Field of the Invention

The present invention relates to a projector. In particular, it relates to a projector in which the distance between a light source and an optical system producing image light from the light produced by the light source and projecting it is relatively short.

2. Description of the Prior Art

There is a conventional projector known wherein exhaust air from a cooling fan for controlling the temperature rise inside the projector is directed away from a projector lens for projecting an image on a screen so that so-called heat waves caused by hot air entering an optical path of the projection lens is prevented (See, for example, JP-A-10-186546; hereafter called Patent Document 1, JP-A-2002-258248; hereafter called Patent Document 2, and JP-A-2002-341448; hereafter called Patent Document 3).

A projector is sometimes configured such that the distance between a light source producing light and an optical system producing image light from the light of the light source and projecting the image light on a screen is relatively short. With the above configuration, it is relatively easy to design an optical path from the light source to the optical system. Further, devices and members for guiding the light from the light source to the optical system can be eliminated, lowering the manufacturing cost of the projector.

In the projector described above, however, the light source becomes very hot while working. Therefore, the hot air of a cooling fan directed to the light source for preventing the rise in temperature inside the projector may enter the optical system or an optical path of the image light emitted from the projection lens, causing the heat-wave effect described above.

SUMMARY OF THE INVENTION

In view of the above, it is an object of the present invention to provide a projector capable of suppressing the occurrence of a heat-wave effect by reducing the hot air entering the optical path.

In order to achieve the above object, the present invention provides a projector which comprises: a light source for producing light; an optical system including an image generating element producing image light from the light produced by the light source and a projection lens for projecting the image light produced by the image generating element; a first fan for controlling the temperature rise near the light source; a second fan for controlling the temperature rise of the optical system; a first partition member for preventing hot air of the second fan from entering the optical system; and a front cover in which exhaust slots are formed for exhausting the hot air from the first and second fans, the front cover and the projection lens being provided on the same side, wherein the front cover comes in contact with the first partition member when mounted or it comprises a second partition member placed with very little clearance between the second partition member and the first partition member.

With the above configuration, the projector of the present invention comprises: a light source for producing light: an optical system including an image generating element generating image light from the light produced by the light source and a projection lens for projecting the image light produced by the image generating element; a first fan for controlling the temperature rise near the light source; a second fan for controlling the temperature rise of the optical system; a first partition member for preventing hot air of the second fan from entering the optical system; and a front cover in which exhaust slots for exhausting the hot air from the first and second fans are formed, the front cover and the projection lens being provided on the same side. Namely, the hot air from the first fan and the second fan is exhausted from the side where the projection lens is provided.

Further, the front cover comes in contact with the first partition member when mounted or it comprises a second partition member placed with very little clearance between the second partition member and the first partition member. Accordingly, when the front cover is mounted, a region where the light source is provided is separated from a region where the optical system is provided. Therefore, the hot air from the first fan does not enter the region where the optical system is provided. Thus, it becomes possible to suppress a heat-wave effect which might be caused by the hot air being exhausted from the exhaust slots of the front cover and entering the optical path of the projection lens.

According to another aspect of the present invention, the front cover comprises an inner grille for preventing light from escaping outside. The inner grille is provided with a fin member as the above second partition member, which comes in contact with the first partition member or is placed with very little clearance between itself and the first partition member when the front cover is mounted.

According to the present aspect with the above configuration, by providing the above inner grille, the light produced by the light source can be prevented from escaping through the exhaust slots of the front cover. Further, the inner grille and the fin member can be formed as one unit, lowering the manufacturing cost of the projector.

According to another aspect of the present invention, the inner grille is provided with openings which are formed, when the front cover is mounted, being tilted in such a manner as to direct the exhaust air away from the above projection lens.

According to the present aspect with the above configuration, it becomes possible to exhaust hot air from the first and second fans through the exhaust slots in such a manner as to direct the hot air away from the projection lens. Therefore, the hot air can be prevented from entering the optical path of the projection lens.

Further, according to another aspect of the present invention, the inner grille is of a black body. According to the present aspect with the above configuration, it becomes possible to absorb light efficiently.

According to the invention as claimed in claim 6, the exhaust slots in the front cover are formed, when the front cover is mounted, being tilted in such a manner as to direct the exhaust air away from the projection lens.

According to claim 6 as configured above, it becomes possible to direct the hot air from the first and second fans away from the projection lens. Therefore, it becomes possible to prevent the hot air from entering the optical path of the projection lens.

According to the invention as claimed in claim 6, it becomes possible to prevent the hot air from entering the optical path.

DESCRIPTION OF THE PREFERRED EMBODIMENTS

Figure 1:
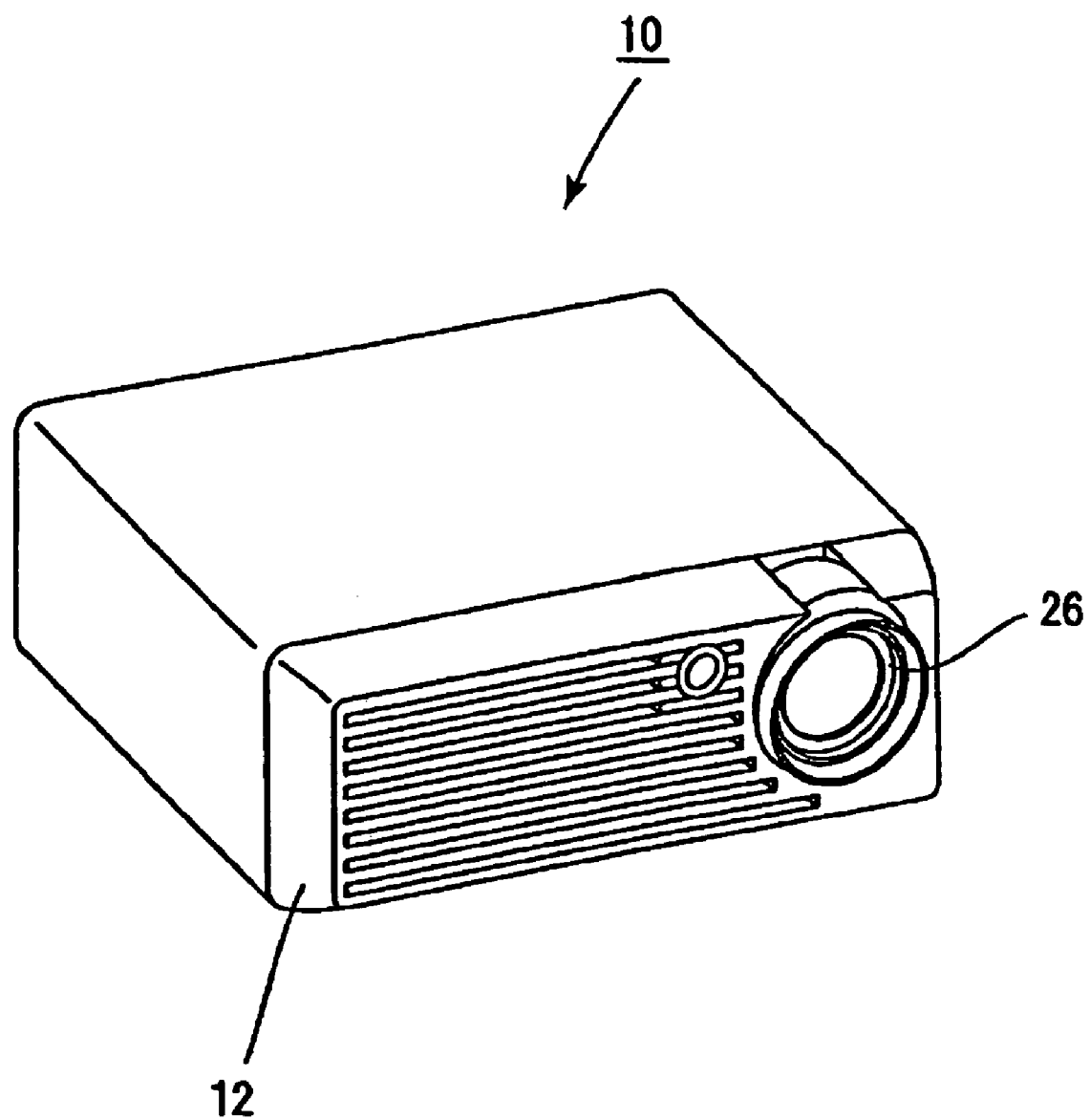
FIG. 1 schematically shows an outward appearance of a projector.
Figure 2:
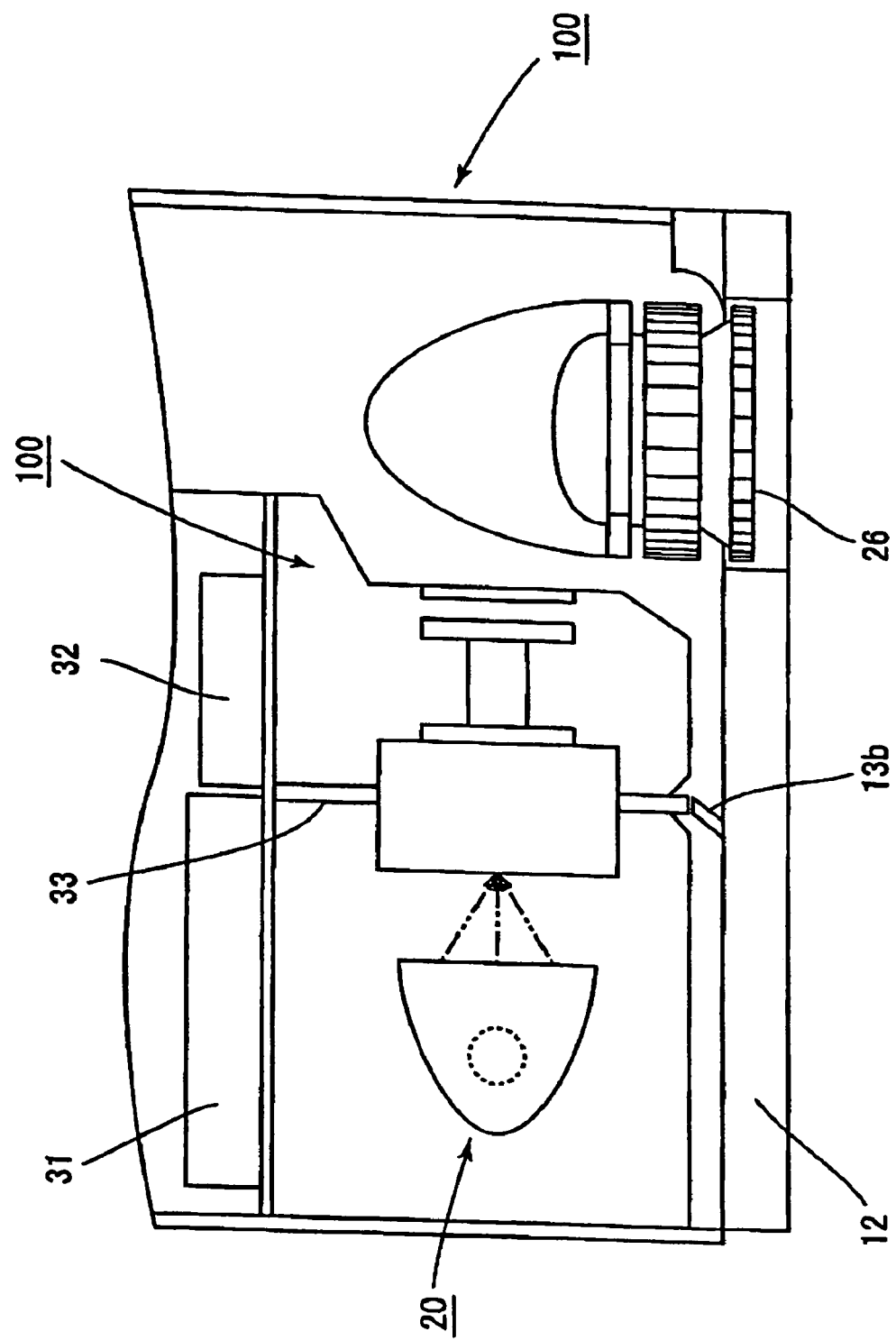
FIG. 2 is a plan view of the projector whose body cover is partially cut away.
Figure 5:
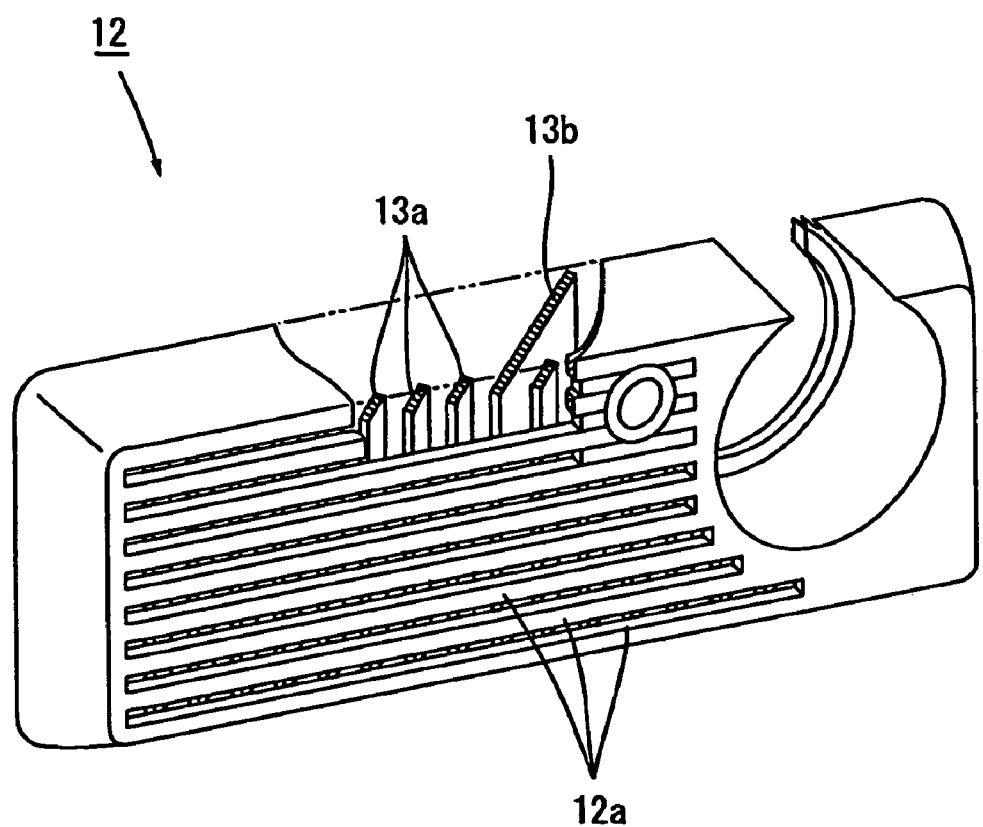
FIG. 5 is a perspective view showing a front side of a front cover.
Figure 6:
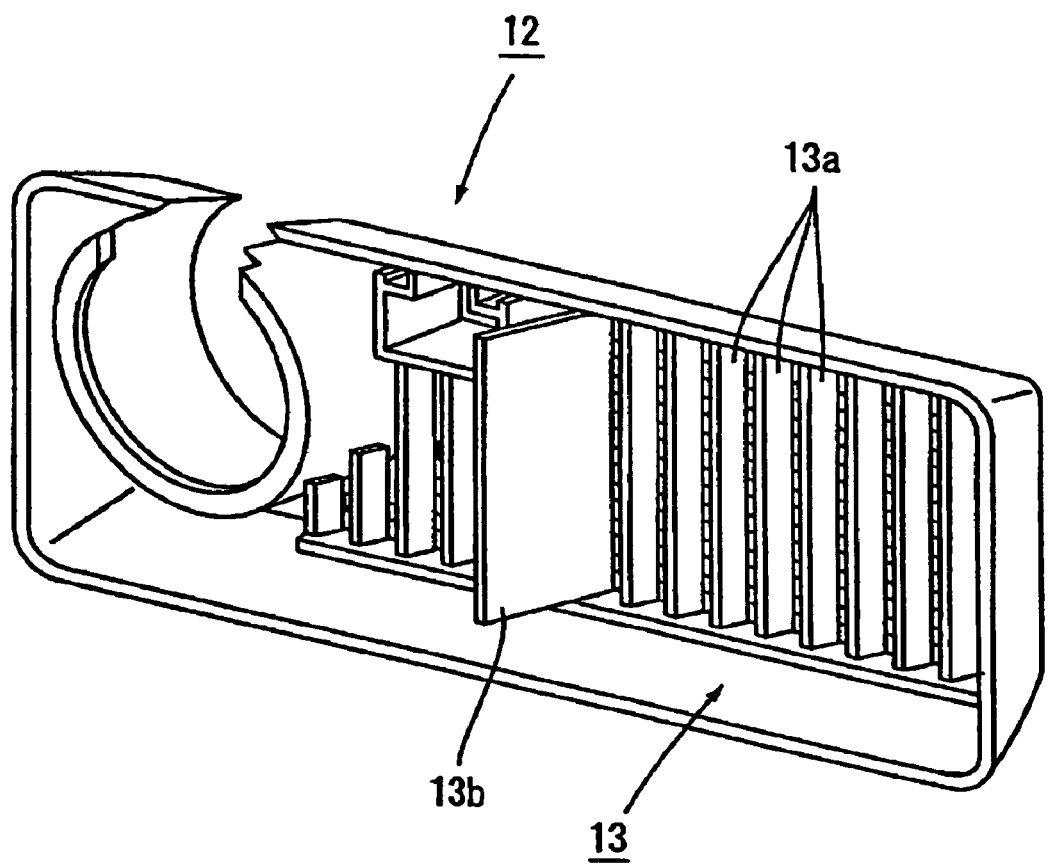
FIG. 6 is a perspective view showing a back side of the front cover.

FIG. 1 schematically shows an outward appearance of the projector according to the present invention, and FIG. 2 is a plan view schematically showing the projector of FIG. 1 whose body cover is partially cut away. In FIG. 1, the projector 10 comprises a projection lens 26. The projection lens 26 projects image light on a screen (not shown) etc., thereby an image is projected on the screen. Further, the front cover 12 is mounted to the front side of the body of the projector 10 (on the side where the projection lens 26 is provided). The front cover 12 will be described later in detail by referring to the drawings (FIGS. 5 and 6).

In FIG. 2, a light source device 20 capable of producing white light is provided in the left front section inside the projector 10 (at the bottom in FIG. 2). The white light produced by the light source device 20 is emitted toward an optical system 100 provided on the right side. The optical system 100 comprises a DMD (Digital Mirror Device) 25 serving as an image generating element (not shown), the projection lens 26, and so on. The optical system 100 produces image light from the light produced by the light source device 20 and projects the image light on a screen. Components of the optical system 100 and a layout thereof will be described below by referring to the drawing (FIG. 3).

Figure 3:
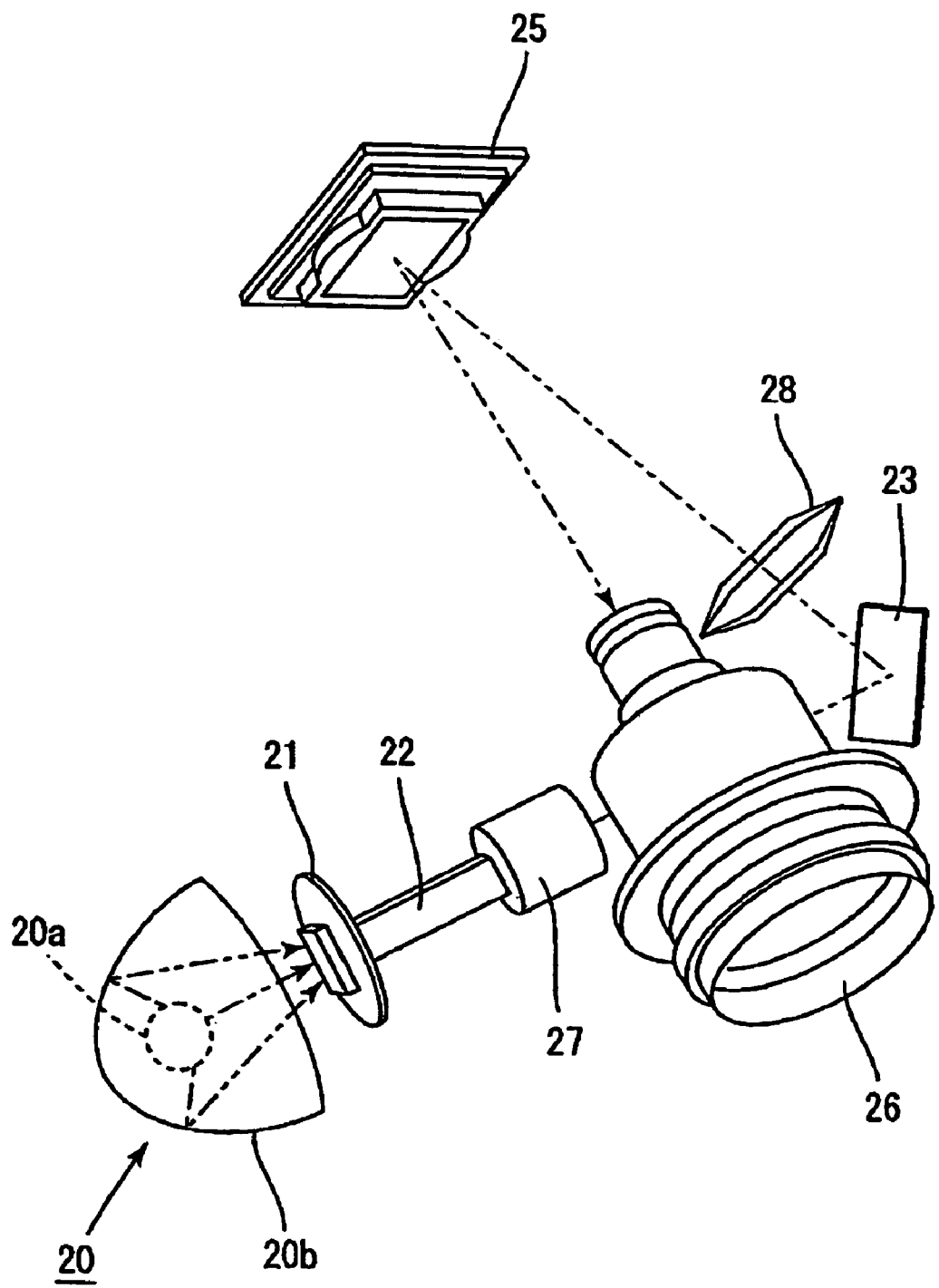
FIG. 3 is a layout plan of components of an optical system of the projector.

FIG. 3 is a layout plan of the components of the optical system 100 shown in FIG. 2. In FIG. 3, the optical system 100 of the projector 10 comprises: the light source device 20 capable of producing white light; a disc-like color wheel 21 having three color filters of R, G, and B (not shown); a light pipe 22 collecting the lights of R, G, and B separated by the color wheel 21 and guiding the light to a mirror 23 described later; the mirror 23 reflecting the light from the light pipe 22; a DMD 25 having a plurality of micro mirrors; and the projection lens 26 projecting the light from the DMD 25 onto a screen. Further, illumination lenses 27 and 28 are provided between the light pipe 22 and the mirror 23, and between the mirror 23 and the DMD 25, respectively.

The light source device 20 comprises a lamp 20a for producing white light and a paraboloidal reflector 20b for reflecting the light emitted backward from the lamp 20a, and emits the light produced by the lamp 20a toward the color wheel 21. As the lamp 20a, for example, a halogen lamp, a metal halide lamp, a high-pressure silver lamp, etc. can be used. Also, as the reflector 20, for example, a paraboloidal mirror, an ellipsoidal mirror, etc. can be used.

The color wheel 21 is of a generally disc-like shape and is provided with three color filters of R, G, B at predetermined intervals. When the color wheel 21 rotates, the white light from the light source device 20 is split into three colors of R, G, and B in sequence. The light pipe 22 is of a column-like shape whose section is generally rectangle, and converts the incident light into light of uniform plane and guides it to the mirror 23. The illumination lens 27 converges the light from the light pipe 22 at the mirror 23. The illumination lens 28 converges the light reflected by the mirror 23 at the DMD 25.

Figure 4:
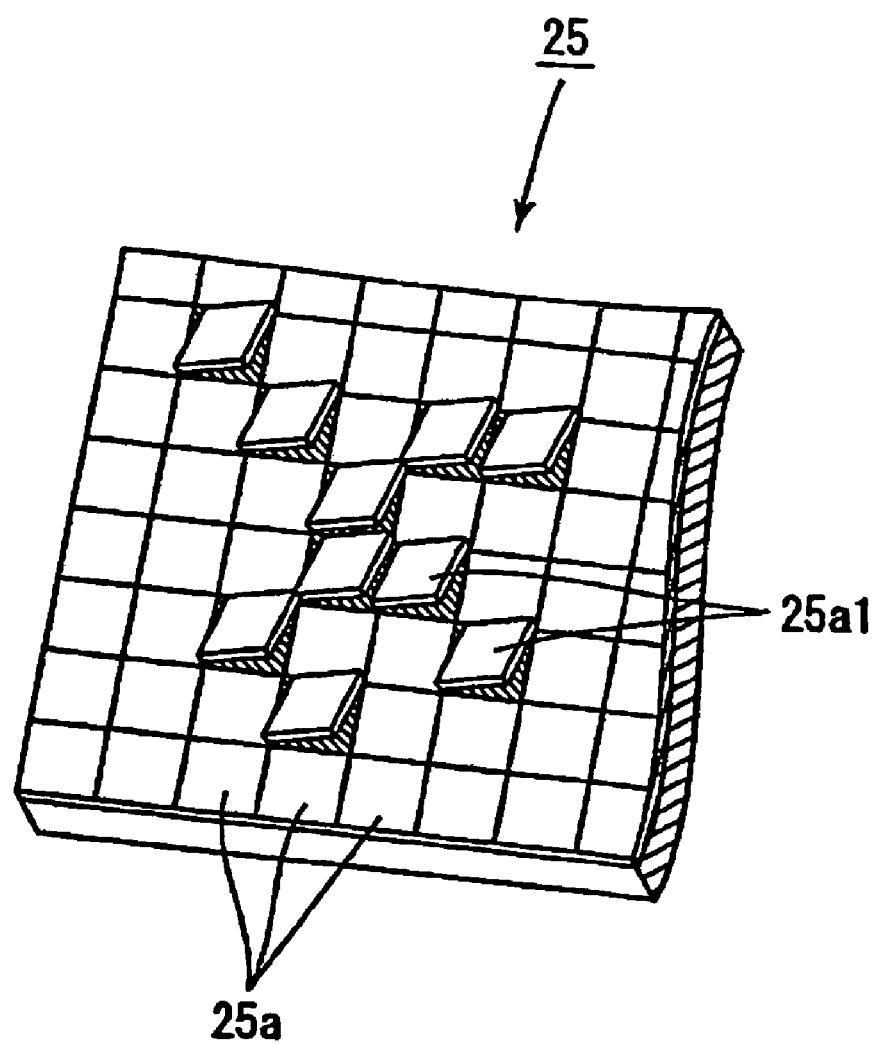
FIG. 4 shows a configuration of a DMD.

As shown in FIG. 4, the DMD 25 comprises a plurality of micro mirrors 25a which serve as modulating elements to modulate every pixel of each light of R, G, and B according to image data. Each micro mirror 25a is independently driven and controlled whose reflecting surface can be tilted at a predetermined angle (for example, 12°).

The projection lens 26 enlarges the image light modulated by the DMD 25 and projects it on a screen. The projection lens 26 is a set of lenses disposed along the optical axis of a plurality of light-collecting elements to prevent the obscurity of the projected image caused by color aberration etc. of each color of R, G, and B.

In FIG. 4, the arrow shows the direction in which light advances. The white light emitted from the light source device 20 is split into three colors of R, G, and B by the color wheel 21. The split colors are collected by the light pipe 22 and guided to the mirror 23. The light from the light pipe 22 is collected by the illumination lens 27 between the light pipe 22 and the mirror 23, enters the mirror 23, and reflected by the mirror 23. The light reflected by the mirror 23 is collected by the illumination lens 28 and enters the DMD 25. The image light modulated by the DMD 25 is enlarged and projected on a screen by the projection lens 26.

Now, referring to FIG. 2 again, the present embodiment will further be described. A first fan 31 for cooling the heat generated by the light source device 20 and preventing the temperature rise inside is provided behind the light source device 20 (in the upper section of FIG. 2). Further, a second fan 32 for preventing the temperature rise near the optical system 100 is provided in the inner part of the optical system 100. The first fan 31 sends air toward the light source device 20 which is provided in front of the first fan 31. The hot air having cooled the light source device 20 is exhausted to the outside through the exhaust slots 12a (not shown) of the front cover 12. The second fan 32 sends air toward the optical system 100 which is provided in front of the second fan 32, and the hot air having cooled the optical system 100 is similarly exhausted through the exhaust slots 12a of the front cover 12. Further, the first fan is larger than the second fan since the light source device 20 becomes very hot while working.

A partition 33 as a first partition member is provided extending downward from the boundary portion between the first fan 31 and the second fan 32. The partition 33 separates a region of the light source device 20 from a region of the optical system 100, which can prevent the hot air of the first fan 31 from entering the region of the optical system 100.

The front cover 12 is mounted to the front side of the body of the projector 10, being on the left of the projection lens 26. FIG. 5 is a perspective view showing a front side of the front cover 12 and FIG. 6 is a perspective view showing a back side of the front cover 12. As shown in FIG. 5, a plurality of latticed exhaust slots 12a are provided in the front cover 12. The each exhaust slot is formed so as to tilt toward the right in FIG. 5 when the front cover 12 is mounted to the body of the projector 10. Thus, the hot air from the first and second fans 31, 32 is exhausted through the exhaust slots 12a in such a manner as to be directed away from the projection lens 26.

As shown in FIG. 6, the front cover 12 comprises an inner grille 13 being of a black body fitted in its back side. The inner grille 13 prevents the light of the light source device 20 from escaping outside. Openings 13a in communication with the exhaust slots 12a are formed in the inner grille 13, allowing hot air from the first and second fans to pass through. These openings 13a, too, are formed to tilt to the left as in the case of the exhaust slots 12a when the front cover 12 is mounted, which can guide the hot air out in such a manner as to direct it away from the projection lens 26.

Further, a fin member 13b is provided in a generally middle section of the inner grille 13. The fin member 13b and the inner grille 13 are formed as one unit. Therefore, compared to a case where the fin member 13b and the inner grille 13 are formed separately, the number of components can be reduced, which can lower the manufacturing cost of the projector.

Now, referring to FIG. 2, the present embodiment will further be described. When the front cover 12 is mounted to the body of the projector 10, as shown in FIG. 2, the fin member 13b of the inner grille 13 is placed with very little clearance between itself and the partition 33. Accordingly, the hot air of the first fan is prevented from passing between the partition 33 and the front cover 12 and entering the region where the optical system 100 is provided. Thus, the configuration described above prevents the hot air from entering the above region and further entering the optical system 100, or being exhausted through the exhaust slots 12a of the front cover 12 to enter the optical path of the projection lens 25 and cause a heat-wave effect.

in the above embodiment, one example is described wherein when the front cover 12 is mounted to the body of the projector 10, the fin member 13b of the inner grille 13 is placed with very little clearance between itself and the partition 33. However, according to the present invention, the second partition member may be in contact with the first partition member.

Further, in the above embodiment, the projector 10 is configured such that the light from the light pipe 22 is reflected by the mirror 23 to enter the DMD 25. However, according to the present invention, the projector does not necessarily have to comprise a mirror. Namely, the light from the light pipe may directly enter the DMD.

Further, in the above embodiment, the projector 10 is a one-chip projector comprising only one DMD 25. However, the present invention can be applied to a three-chip projector having 3 DMDs corresponding to respective lights of three colors R, G, and B, or a two-chip projector having 2 DMDs.

Further, in the above embodiment, the projector 10 is a projector of DLP (Digital Light Processing) type using a DMD (Digital Mirror Device) as an image generating element. However, the projector of the present invention is not limited to the above. For example, it may be a liquid crystal projector using a liquid-crystal panel as an image generating element.

As described above, in the projector 10 of the present embodiment, when the front cover 12 in which the inner grille 13 is fitted is mounted to the body of the projector, the fin member 13b formed as one unit with the inner grille 13 is placed with very little clearance between itself and the partition 33 separating the region where the light source device 20 is provided from the region where the optical system 100 is provided. Therefore, the hot air of the first fan can be prevented from passing between the partition 33 and the front cover 12 and entering the region where the optical system 100 is provided. As a result, it becomes possible to prevent the hot air from entering the above region and further entering the optical system 100 or entering the optical path of the projection lens 26 to cause a heat-wave effect.

What is claimed is:

1. A projector comprising:
a first partition member oriented along an axial width of the projector, separating a housing of the projector into a first substantially isolated chamber and a second substantially isolated chamber;
a fin member positioned in close proximity to an end of the partition member to facilitate further isolation between the first substantially isolated chamber and the second substantially isolated chamber;
a light source for producing light is housed in the first substantially isolated chamber;
an optical system, a region of which is housed in the second substantially isolated chamber, including an image generating element producing image light from a light produced by the light source and a projection lens for projecting the image light produced by the image generating element;
a first fan for controlling the temperature rise near the light source, and forming a first end of the first substantially isolated chamber;
a second fan for controlling the temperature rise of the optical system, and forming a first end of the second substantially isolated chamber;
the first partition member and the fin member substantially separating airflows resulting from the first fan and the second fan from intake at the first end of the first and second substantially isolated chambers to exhaust at a second end of the first and second substantially isolated chamber, preventing a combining of the airflows within the housing of the projector; and
a front cover having tilted exhaust slots formed for exhausting the hot air from said first and second fans when said front cover is mounted, in such a manner as to direct the exhaust air away from said projection lens;
said front cover and said projection lens provided on the same side of the projector,
said front cover further comprises an inner grille of a black body for preventing the light from escaping; and
said inner grille is provided with the fin member and openings tilted in such a manner as to direct the exhaust air from the first and the second fans and the light from the light source away from said projection lens when said front cover is mounted.

2. A projector comprising:
a first partition member oriented along an axial width of the projector, separating a housing of the projector into a first substantially isolated chamber and a second substantially isolated chamber;
a fin member positioned in close proximity to an end of the partition member to facilitate further isolation between the first substantially isolated chamber and the second substantially isolated chamber;
a light source for producing light is housed in the first substantially isolated chamber;
an optical system, a region of which is housed in the second substantially isolated chamber, including an image generating element producing image light from a light produced by the light source and a projection lens for projecting the image light produced by the image generating element;
a first fan for controlling the temperature rise near the light source, and forming a first end of the first substantially isolated chamber;
a second fan for controlling the temperature rise of the optical system, and forming a first end of the second substantially isolated chamber;

the first partition member and the fin member substantially separating airflows resulting from the first fan and the second fan from intake at the first end of the first and second substantially isolated chambers to exhaust at a second end of the first and second substantially isolated chamber, preventing a combining of the airflows within the housing of the projector; and a front cover in which exhaust slots are formed for exhausting the hot air from said first and second fans, said front cover and said projection lens being provided on the same side, said front cover comes in contact with said first partition member when mounted or is comprised of the fin member placed with very little clearance between the fin member and said first partition member.

3. A projector according to claim 2, wherein said front cover comprises an inner grille for preventing the light from escaping and said inner grille comprises the fin member.

4. A projector according to claim 3, wherein said inner grille is provided with openings tilted in such a manner as to direct the exhaust air away from said projection lens when said front cover is mounted.

5. A projector according to claim 3, wherein said inner grille is of a black body.

6. A projector according to claim 2, wherein said exhaust slots formed in said front cover is tilted to direct the exhaust air away from said projection lens.

7. A projector according to claim 2, wherein a light source device capable of producing white light is provided at the left front as viewed from the front and, when the white light produced by the light source device is irradiated toward the optical system provided at the right front as viewed from the front, image light is produced by a digital mirror device serving as an image generating element and the projection lens in the optical system and is projected on an external screen.

8. A projector according to claim 7, wherein said optical system comprises: a light source device capable of producing white light; a disc-like color wheel having color filters of R, G, and B; a light pipe for collecting the light of R, G, and B split by the color wheel and guiding the light in a predetermined direction; a mirror for reflecting the light from the light pipe; a digital mirror device having a plurality of micro mirrors; and a projection lens for projecting the light from the digital mirror device on an external screen, and wherein illumination lenses are provided between said light pipe and the mirror as well as between said mirror and the digital mirror device, respectively.

* * * * *